US011070998B2

(12) United States Patent
Sharma et al.

(10) Patent No.: US 11,070,998 B2
(45) Date of Patent: Jul. 20, 2021

(54) APPARATUS AND METHOD FOR A MOBILE TELECOMMUNICATIONS SYSTEM

(71) Applicant: Sony Corporation, Tokyo (JP)

(72) Inventors: Vivek Sharma, Basingstoke (GB); Brian Alexander Martin, Basingstoke (GB); Hideji Wakabayashi, Basingstoke (GB); Shinichiro Tsuda, Basingstoke (GB); Yuxin Wei, Basingstoke (GB)

(73) Assignee: SONY CORPORATION, Tokyo (JP)

( * ) Notice: Subject to any disclaimer, the term of this patent is extended or adjusted under 35 U.S.C. 154(b) by 5 days.

(21) Appl. No.: 16/469,652

(22) PCT Filed: Dec. 21, 2017

(86) PCT No.: PCT/EP2017/084280
§ 371 (c)(1),
(2) Date: Jun. 14, 2019

(87) PCT Pub. No.: WO2018/115387
PCT Pub. Date: Jun. 28, 2018

(65) Prior Publication Data
US 2019/0313273 A1    Oct. 10, 2019

(30) Foreign Application Priority Data

Dec. 22, 2016  (EP) .................................... 16206101

(51) Int. Cl.
*H04W 24/10*    (2009.01)
*H04W 76/18*    (2018.01)
*H04W 76/11*    (2018.01)
*H04W 76/27*    (2018.01)
*H04B 7/06*     (2006.01)
*H04W 8/08*     (2009.01)
*H04W 36/00*    (2009.01)
(Continued)

(52) U.S. Cl.
CPC .......... *H04W 24/10* (2013.01); *H04B 7/0408* (2013.01); *H04B 7/0617* (2013.01); *H04W 8/08* (2013.01); *H04W 16/28* (2013.01); *H04W 36/0061* (2013.01); *H04W 72/046* (2013.01); *H04W 76/11* (2018.02); *H04W 76/18* (2018.02); *H04W 76/19* (2018.02); *H04W 76/27* (2018.02); *H04W 88/08* (2013.01); *H04B 7/088* (2013.01)

(58) Field of Classification Search
CPC .................................................... H04W 24/10
See application file for complete search history.

(56) References Cited

U.S. PATENT DOCUMENTS

2014/0036656 A1* 2/2014 Chou ...................... H04L 47/27
370/216
2015/0092746 A1  4/2015 Jang et al.
(Continued)

OTHER PUBLICATIONS

International Search Report and Written Opinion dated Apr. 4, 2018 for PCT/EP2017/084280 filed on Dec. 21, 2017, 14 pages.
(Continued)

*Primary Examiner* — Jason E Mattis
(74) *Attorney, Agent, or Firm* — Xsensus, LLP

(57) ABSTRACT

An apparatus comprising circuitry configured to receive or transmit a radio link failure report, the radio link failure report comprising beam specific information.

20 Claims, 10 Drawing Sheets

(51) Int. Cl.
  *H04W 72/04* (2009.01)
  *H04W 88/08* (2009.01)
  *H04W 16/28* (2009.01)
  *H04W 76/19* (2018.01)
  *H04B 7/0408* (2017.01)
  *H04B 7/08* (2006.01)

(56) References Cited

U.S. PATENT DOCUMENTS

2016/0150435 A1    5/2016  Baek et al.
2019/0081688 A1*   3/2019  Deenoo .................. H04B 7/088
2019/0174346 A1*   6/2019  Murray .................. H04W 80/02

OTHER PUBLICATIONS le;.4qNTT DOCOMO, "New SID Proposal: Study on New Radio Access Technology", 3GPP TSG RAN Meeting No. 71 RP-160671, Goteborg, Sweden, Mar. 7-10, 2016, 8 pages.

3GPP, "3rd Generation Partnership Project; Technical Specification Group Radio Access Network; Evolved Universal Terrestrial Radio Access (E-UTRA) and Evolved Universal Terrestrial Radio Access Network (E-UTRAN)", Overall Description; Stage 2, Release 14, 3GPP TS 36.300 V14.1.0, Dec. 2016, pp. 1-317.

3GPP, "3rd Generation Partnership Project; Technical Specification Group Radio Access Network; Evolved Universal Terrestrial Radio Access (E-UTRA); Radio Resource Control (RRC)", Protocol specification, Release 10, 3GPP TS 36.331 V10.19.0, Dec. 2015, pp. 1-317.

3GPP, "3rd Generation Partnership Project; Technical Specification Group Radio Access Network; Evolved Universal Terrestrial Radio Access Network (E-UTRAN)", X2 application protocol (X2AP), Release 13, 3GPP TS 36.423 V13.5.0, Sep. 2016, pp. 1-238.

* cited by examiner

```
UEInformationRequest
 └ rlf-ReportReq
```

Fig. 4

```
UEInformationResponse
 └ RLFReportContainer
     ├ measResultLastServCell
     ├ measResultNeighCells
     ├ locationInfo
     ├ failedPCellId
     ├ reestablishmentCellId
     ├ timeConnFailure
     ├ connectionFailureType
     ├ previousPCellId
     └ beamMobility
```

Fig. 5a

```
UEInformationResponse
└ RLFReportContainer
    ├ measResultLastServCell
    ├ measResultNeighCells
    ├ locationInfo
    ├ failedPCellId
    ├ reestablishmentCellId
    ├ timeConnFailure
    ├ connectionFailureType
    └ previousPCellId
  └ beamMobility
```

Fig. 5b

```
RLFReportContainer
  ├ measResultLastServCell
  ├ failedPCellId
  └ beamMobility
```

Fig. 6

```
RLFIndication
  ├ reestablishmentCellECGI
  ├ FailureCellPCI
  ├ C-RNTI
  ├ ShortMAC-I
  └ RLFReportContainer
      ├ measResultLastServCell
      ├ measResultNeighCells
      ├ locationInfo
      ├ failedPCellId
      ├ reestablishmentCellId
      ├ timeConnFailure
      ├ connectionFailureType
      ├ previousPCellId
      └ beamMobility
  ├ RRCConnSetupIndicator
  └ RRCConnReestabIndicator
```

Fig. 7a

```
RLFIndication
  ├ reestablishmentCellECGI
  ├ FailureCellPCI
  ├ C-RNTI
  ├ ShortMAC-I
  └ RLFReportContainer
      ├ measResultLastServCell
      ├ measResultNeighCells
      ├ locationInfo
      ├ failedPCellId
      ├ reestablishmentCellId
      ├ timeConnFailure
      ├ connectionFailureType
      └ previousPCellId
  ├ beamMobility
  ├ RRCConnSetupIndicator
  └ RRCConnReestabIndicator
```

Fig. 7b

```
beamMobility
    ├ bestBeamId
    ├ bestBeamMeasResult
    ├ detectedBeamsIds
    ├ detectedBeamsMeasResults
    ├ fallbackBeamId
    ├ fallbackBeamMeasResults
    ├ servingBeamId
    ├ neighbouringBeamsIds
    ├ ULreferenceSignals
    ├ SFNaeraId
    ├ FailedBeamId
    ├ FailedBeamTimestamp
    └ spentTime
```

Fig. 8

```
RLF Report Container
    ├ measResultLastServCell
    ├ measResultNeighCells
    ├ locationInfo
    ├ failedPCellId
    ├ reestablishmentCellId
    ├ timeConnFailure
    ├ connectionFailureType
    ├ previousPCellId
    ├ bestBeamId
    ├ bestBeamMeasResult
    ├ detectedBeamsIds
    └ detectedBeamsMeasResults
```

Fig. 9

```
Handover Report
 └ Message Type
 └ Handover Report Type
 └ Handover Cause
 └ Source cell ECGI
 └ Handover Cause
 └ Failure cell ECGI
 └ Re-establishment cell ECGI
 └ Target cell in UTRAN
 └ Source cell C-RNTI
 └ Mobility Information
 └ RLF Report Container
    └ measResultLastServCell
    └ measResultNeighCells
    └ locationInfo
    └ failedPCellId
    └ reestablishmentCellId
    └ timeConnFailure
    └ connectionFailureType
    └ previousPCellId
    └ beamMobility
```

Fig. 10a

```
Handover Report
 L MessageType
 L HandoverReportType
 L HandoverCause
 L SourceCellECGI
 L HandoverCause
 L FailureCellECGI
 L Re-establishmentCellECGI
 L TargetCellinUTRAN
 L SourceCellC-RNTI
 L MobilityInformation
 L BeamMobilityInformation
 L RLF Report Container
    L measResultLastServCell
    L measResultNeighCells
    L locationInfo
    L failedPCellId
    L reestablishmentCellId
    L timeConnFailure
    L connectionFailureType
    L previousPCellId
 L beamMobility
```

Fig. 10b

APPARATUS AND METHOD FOR A MOBILE TELECOMMUNICATIONS SYSTEM

CROSS-REFERENCE TO RELATED APPLICATIONS

The present application is based on PCT filing PCT/EP2017/084280, filed Dec. 21, 2017 which claims priority to EP 16206101.4, filed Dec. 22, 2016, the entire contents of each are incorporated herein by reference.

TECHNICAL FIELD

The present disclosure generally pertains to entities and user equipment of a mobile telecommunications system.

TECHNICAL BACKGROUND

Several generations of mobile telecommunications systems are known, e.g. the third generation ("3G"), which is based on the International Mobile Telecommunications-2000 (IMT-2000) specifications, the fourth generation ("4G"), which provides capabilities as defined in the International Mobile Telecommunications-Advanced Standard (IMT-Advanced Standard), and the current fifth generation ("5G"), which is under development and which might be put into practice in the year 2020.

A candidate for providing the requirements of 5G is the so called Long Term Evolution ("LTE"), which is a wireless communication technology allowing high-speed data communications for mobile phones and data terminals and which is already used for 4G mobile telecommunications systems. Other candidates for meeting the 5G requirements are termed New Radio Access Technology Systems (NR). An NR can be based on LTE technology, just as LTE was based on previous generations of mobile communications technology.

LTE is based on the GSM/EDGE ("Global System for Mobile Communications"/"Enhanced Data rates for GSM Evolution" also called EGPRS) of the second generation ("2G") and UMTS/HSPA ("Universal Mobile Telecommunications System"/"High Speed Packet Access") of the third generation "3G") network technologies.

LTE is standardized under the control of 3GPP ("3rd Generation Partnership Project"). There exists a successor LTE-A (LTE Advanced) allowing higher data rates as the basis LTE which is also standardized under the control of 3GPP.

For the future, 3GPP plans to further develop LTE-A, such that it will be able to fulfill the technical requirements of 5G.

However, although there exist signaling techniques for the 5G technologies, it is generally desirable to improve the signaling in such technologies.

SUMMARY

According to a first aspect, the disclosure provides an apparatus comprising circuitry configured to receive or transmit a radio link failure report, the radio link failure report comprising beam specific information.

According to a further aspect, the disclosure provides a method comprising receiving or transmitting a radio link failure report, the radio link failure report comprising beam specific information.

Further aspects are set forth in the dependent claims, the following description and the drawings.

BRIEF DESCRIPTION OF THE DRAWINGS

Before a detailed description of the embodiments under reference of FIG. 1 is given, some general explanations are made.

FIG. 4 describes an embodiment of a UE Information Request message;

FIG. 5a describes an embodiment of a UE Information Response message;

FIG. 5b describes a further embodiment of a UE Information Response message;

FIG. 6 shows an embodiment of an Radio Link Failure (RLF) Report;

FIG. 7a describes an embodiment of a Radio Link Failure (RLF) Indication message;

FIG. 7b describes an alternative embodiment of a Radio Link Failure (RLF) Indication message;

FIG. 8 describes an embodiment of beam specific information;

FIG. 9 provides an embodiment in which beam specific information is directly included as information elements in an RLFReportContainer information element;

FIG. 10a describes an embodiment of a Handover Report message;

FIG. 10b describes an alternative embodiment of a Handover Report message;

DETAILED DESCRIPTION OF EMBODIMENTS

Figure 1:
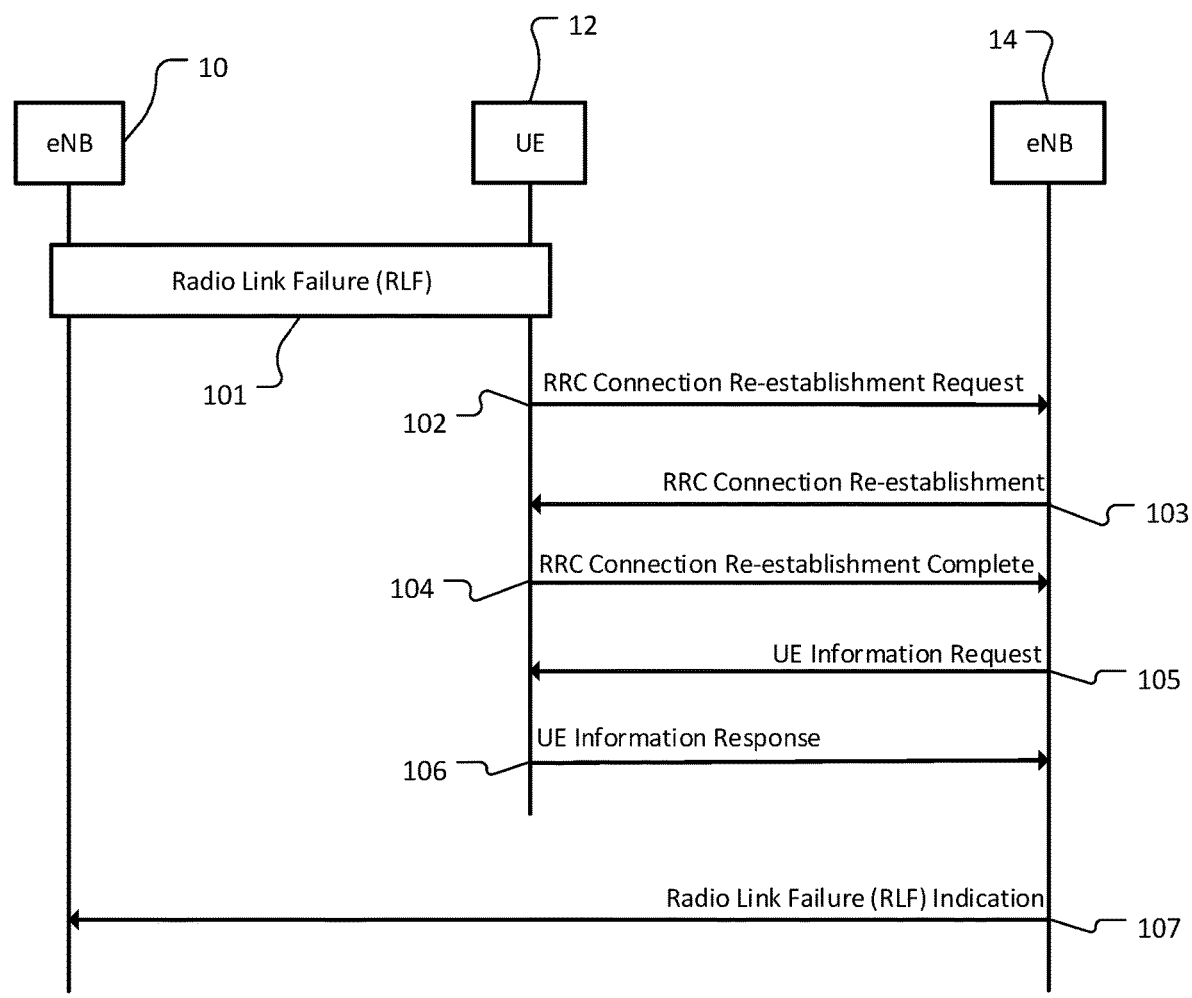
FIG. 1 describes signalling in an exemplifying scenario where a radio link failure happens during a handover procedure.

Before a detailed description of the embodiments under reference of FIG. 1 is given, some general explanations are made.

As the 5G system will be based on LTE or LTE-A, respectively, it is assumed that specific requirements of the 5G technologies will, basically, be dealt with by features and methods which are already defined in the LTE and LTE-A standard documentation.

5G technologies will allow a concept of a so called "virtual cell" or "local cell" or the like, which may also be based on New Radio Access Technology Systems (NR). In this concept, a cell is served by a user equipment ("UE"), e.g. a mobile phone, a computer, tablet, tablet personal computer or the like including a mobile communication interface, or any other device which is able to perform a mobile telecommunication via, for example, LTE(-A), such as a hot spot device with a mobile communication interface. In short, the UE works dynamically as an intermediate node for establishing an indirect network connection between other UEs in the vicinity of the virtual cell or local cell and the network, and/or as an intermediate node between UEs. A function of the intermediate node on the UE may also be carried out by "virtualization". A virtual cell or local cell may communicate with UEs in unlicensed, shared licensed or licensed bands, and it backhauls to network preferably in licensed bands.

A logical separation between control plane and user plane has been achieved in accordance with the introduction of the IP Multimedia System (IMS) for LTE, and a physical separation between control plane and user plane has been proposed as a possible solution for 5G or NR. Since requirements for the control plane should be basically robustness and wide coverage so as to maintain the service continuity, a macro or anchor entity (e.g. base station or Evolved Node B) should provide a link of the control plane. On the other hand, a key performance of the user plane is the efficient spectrum usage in order to improve the cell capacity. However, since the requirements of the user plane are highly depending on specific use case or UE capability/category, a variety of types of reception/transmission or routing methods are considered according to the respective use case or UE capability/category taking into account a concept for 5G such as "network slicing".

For the 5G technologies, it is envisaged that a UE or other NR station in the function as a virtual cell, local cell, micro or pico cell, Transmission/Reception Point (TRP), small cell provided by NR eNBs, or the like should be able to take over responsibilities, which are typically handled, for example, in a base station gNB, or eNB (Evolved Node B, or eNodeB) as it is called in LTE (the eNB is the element in the evolved UTRA of LTE, the UTRA being the UMTS Terrestrial Radio Access). Such responsibilities, which are envisaged to be performed in the UE as a virtual cell or the other NR stations or entities mentioned above, are, for example, radio resource management, radio resource control (RRC), connection control, etc.

Mobility robustness optimization provides support for detecting and helping to correct connection failures caused by intra-network mobility and unnecessary inter-system handovers to other radio access technologies. Typical mobility scenarios are that a handover occurs too late or too early or a handover to a wrong cell. Such failure scenarios can be detected after an RRC connection re-establishment, or after an RRC connection setup.

The embodiments disclose an apparatus comprising circuitry configured to receive or transmit a report, the report comprising beam specific information.

The apparatus may be any entity of a telecommunications system, e.g. an entity of a New Radio Access Technology Systems. It may for example be a user equipment (UE), a base station gNB (or eNB), a virtual cell, a local cell, a micro or pico cell, a Transmission/Reception Point (TRP), a small cell, or the like.

An apparatus as described above may for example be a mobile telecommunications system entity, in particular anchor entity, for a mobile telecommunications system including at least one entity serving at least one user equipment, wherein the at least one entity and the at least one user equipment are located in a common system information area, as discussed above.

The circuitry may include at least one of: processor, microprocessor, dedicated circuit, memory, storage, radio interface, wireless interface, network interface, or the like, e.g. typical electronic components which are included in a base station, such as an eNodeB.

The report comprising beam specific information may for example be a radio link failure report.

A radio link failure report may be any information that is transmitted to provide information about a radio link failure and/or any information that is related with a radio link failure, for example information concerning the surroundings in which a radio link failure happened. The term radio link failure report as used in this disclosure should thus not be limited to a specific kind of radio link report defined in a standard document. Still further, the term radio link failure report as used throughout this disclosure does not imply that all information comprised in the radio link failure report must be included in a specific superordinate information element, e.g. in a RLF container element. Instead, the information that makes up a radio link failure report may be transmitted within one or multiple container elements, or it may be transmitted separately.

Alternatively, the report comprising beam specific information may be a mobility report. A mobility report may for example be a report that comprises information concerning the mobility of a UE within a cell or system information area.

Beam specific information may be any kind of information that is related specifically to radio beams. For example, beam specific information may be any information that is attributed to a specific beam, such as an identifier that is specific to a beam, measurement results concerning a specific beam, etc.

The beam specific information may for example comprise information about beams used at the time of a radio link failure.

Still further, the beam specific information may comprise information about the surrounding environment at the time of a radio link failure.

Still further, the beam specific information may comprise measurements of other beams, time spent in a serving beam, a fallback beam configuration and/or a timestamp at the time of RLF.

According to the embodiments described below in more detail, the beam specific information comprises one or more of the following information elements: information elements that provide information about the Best beam ID and its measurements; an information element that define the number N (or the set) of best beams, their IDs and their measurements; information elements that provide information about the beams detected by the UE, e.g. the respective beam IDs and their measurements; information elements that identify beams above a predefined threshold and their ID and respective measurements; information elements that provide fallback beam IDs where the UE can fallback in the event of a failure of a serving beam and corresponding measurements; an information element that provides the identity of the serving beam; information elements that provide the identities of neighbouring beams; information elements that provide UL reference signals corresponding to a serving or neighbouring beam used of uplink reference signal based mobility; an information element that provides a Single Frequency Network Area ID; information elements that provide a Failed beam ID and timestamp of an RLF; an information element that provides a time the UE spent in a serving beam before the RLF happened; an information element that provides a time spent in a combination of a serving beam and its configured fallback beam; and an information element that provides a time spent in a fallback beam set.

According to the embodiments described below in more detail, the apparatus is a Transmission/Reception Point of a New Radio Access Technology System.

For example, the apparatus may be a User Equipment (UE) or an Evolved Node B (eNB).

Still further, the beam specific information may relate to a radio link failure between a User Equipment (UE) and an Evolved Node B (eNB).

According to embodiments described below, the beam specific information may be gathered while operating at higher frequencies, e.g. at frequencies above 6 GHz.

Still further, according to embodiments described below, the beam specific information is gathered while operating using beam forming. Beam forming (also called spatial filtering) may for example be any signal processing technique used in sensor arrays for directional signal transmission or reception.

The apparatus may be a User Equipment (UE) that is configured to send the radio link failure report to a target Evolved Node B (eNB) after experiencing a radio link failure at a source Evolved Node B (eNB).

The apparatus may be a target Evolved Node B (eNB) that is configured to receive, during a re-connection process, a radio link failure report from a User Equipment (UE) that experienced a radio link failure at a source Evolved Node B (eNB), and to transmit the received radio link failure report to this source Evolved Node B (eNB).

The embodiments also provide a method comprising receiving or transmitting a radio link failure report, the radio link failure report comprising beam specific information.

FIG. 1 describes signalling in an exemplifying scenario where a radio link failure happens during a handover procedure. At 101, a Radio Link Failure (RLF) happens between a UE 12 and a source eNB 10 prior to handover to a target eNB 14. After the Radio Link Failure (RLF), the UE 12 stores information concerning the Radio Link Failure (RLF information) and the UE 12 attempts to reestablish its radio link at a target cell, here at target eNB 14. To this end, at 102, UE 12 sends a RRC Connection Re-establishment Request to target eNB 14. At 103, target eNB 14 answers this request by sending a RRC Connection Re-establishment message to UE 12. At 104, UE 12 sends a RRC Connection Re-establishment Complete message to the target eNB 14. Within this RRC Connection Re-establishment Complete message UE 12 includes a flag to indicate that radio link failure information is available for reporting. After receiving this flag, at 105, the target eNB 14 sends a UE Information Request message to UE 12 to request the UE 12 to report the RLF information. At 106, UE 102 sends a UE Information Response message to the target eNB to provide its report (RLF information) to the target eNB 14. That is, when a re-establishment request is received or a connection failure reported after RRC connection setup or an incoming successful handover, the eNB 14 may for example use cell identifiers provided by the UE to identify the potentially previous serving cell/eNB 10. In the example described here, the RRC connection re-establishment 102-104 has been completed at a serving cell which is associated with target eNB 14, i.e. at a serving cell that is not associated with source eNB 10. Accordingly, at 107, target eNB 14 which has received the RLF information from UE 12 sends a Radio Link Failure Indication message to source eNB 10 via the X2-AP communication interface. This Radio Link Failure Indication message includes the RLF information obtained from UE 12.

It should be noted that in the above example, the UE 12 includes the flag to indicate that radio link failure information is available for reporting into the RRC Connection Re-establishment Complete message. However, alternatively, the UE may also include this flag within an RRC Connection Reconfiguration Complete message or within a RRC Connection Setup Complete message.

Figure 2:
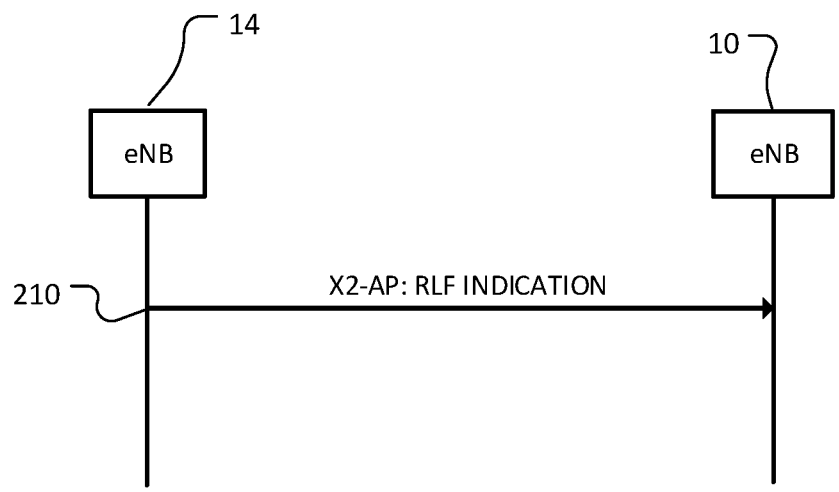
FIG. 2 describes an example of a Radio Link Failure Indication procedure.

FIG. 2 describes an example of a Radio Link Failure Indication procedure as defined in ETSI document TS 136 300. The purpose of the Radio Link Failure Indication procedure is to enable mobility robustness and radio link failure recovery improvement in E-UTRAN by passing, at 210, information about a failure event (RLF information) over the X2 interface between two eNBs 10 and 14. The eNB 14 that received the RLF failure report from a UE (see FIG. 1 above) sends an RLF indication message to the concerned eNB(s), here eNB 10. The previously serving eNB 10 may then match the correct context, or use the information available in the RLF report, if included in the RLF indication message, to analyze the possible root cause of the failure. If the previous serving eNB matches the correct context, it may also trigger the Handover Preparation procedure towards the eNB that initiated the Radio Link Failure Indication procedure.

Figure 3:
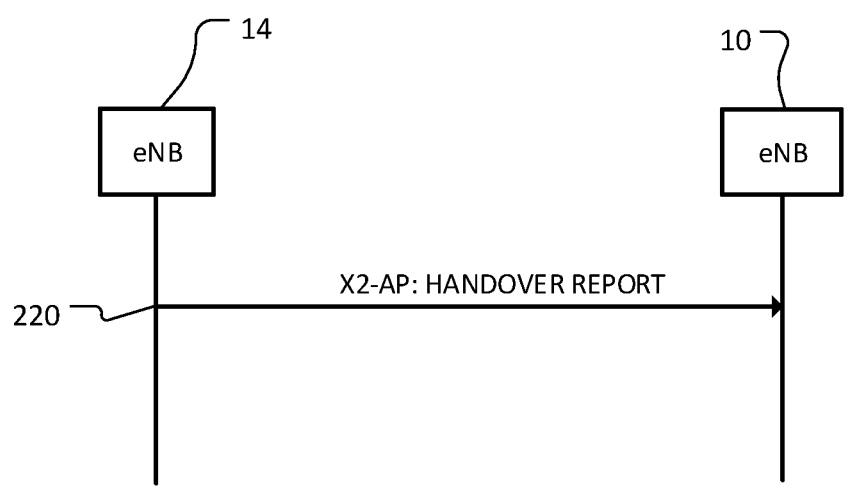
FIG. 3 describes an example of a Handover Report procedure.

FIG. 3 describes an example of a Handover Report procedure as defined in ETSI document TS 36 300. The purpose of the Handover Report procedure is to enable mobility robustness improvement in E-UTRAN. The Handover Report procedure is provided to transfer mobility related information between eNBs. In particular, the Handover Report procedure is used to pass information connected to the analysis of an RLF which occurred shortly after a successful handover between a source eNB 10 and a target eNB 14. At 220, the eNB where the RLF occurred (original target eNB 14) sends a Handover Report message to the original source eNB 10, identifying the source cell, the target cell, and the cell where re-establishment took place. The Handover Report procedure is also used to pass information connected to potential inter-RAT ping-pong cases. The eNB that detected the potential ping-pong cases sends a Handover Report message to the source eNB of the first inter-RAT handover, identifying the source and the target cells of the first inter-RAT handover, and the target cell of the second inter-RAT handover.

FIG. 4 describes an embodiment of a UE Information Request message according to the present disclosure. This UE Information Request message may be sent by a target eNB to a UE to request for an RLF report, as it is described above with regard to process 105 in FIG. 1. The UE Information Request message according to this embodiment comprises an rlf-ReportReq information element. This rlf-ReportReq information element is of the type BOOLEAN, where true indicates that an RLF Report is requested.

FIG. 5a describes an embodiment of a UE Information Response message according to the present disclosure. This UE Information Response message may be used by an UE to send to a target eNB an RLF report, as it is described above with regard to process 106 in FIG. 1. An eNB may for example use RLF information received in the RLF report from multiple UEs to set the parameters in a Mobility Settings Change procedure.

The UE Information Response message according to this embodiment comprises a container information element RLFReportContainer which comprises RLF information. The RLFReportContainer according to this embodiment comprises as information elements: measResultLastServCell, measResultNeighCells, locationInfo, failedPCellId, reestablishmentCellId, timeConnFailure, connectionFailureType, previousPCellId, and beamMobility. The measResultLastServCell information element includes measurement results, e.g. RSRP and, optionally, RSRQ from the source cell, i.e. these measurements are obtained by the UE from the cell where the radio link failure was experienced (101 in FIG. 1). The measResultNeighCells may optionally include measurement results from neighbouring cells. The location-Info information element comprises location information concerning the geographic location where the radio link failure happened. The failedPCellId information element relates to the Failed Primary Cell Identity that defines the primary cell in which radio link failure was detected or the target primary cell of the failed handover. The reestablishmentCellId information element relates to the Re-establishment Cell Identity that defines the CGI of the cell where the UE initiated a connection re-establishment after the radio link failure. The timeConnFailure information element defines the time interval between the handover initialisation and the radio link failure. The connectionFailureType information element indicates the type of failure, e.g. whether the failure was a radio link failure or a handover failure. A new type of failure IE "beam failure" may be defined in order to address the cases where a dedicated beam may fail but common beams had good coverage. This will distinguish the case from RLF and HO failure and address beam management issues. The previousPCellId information element defines the source primary cell of the last handover. The beamMobility information element comprises information concerning the beams the UE was using at the time of the RLF and surrounding environment related to measurements of other beams, time spent in serving beam, fallback beam configuration, timestamp at the time of RLF etc.

FIG. 5b describes a further embodiment of a UE Information Response message according to the present disclosure. According to this embodiment, the beamMobility information element is not comprised in the RLFReportContainer, but is transmitted as an additional information element of the UE Information Response message in parallel to the RLFReportContainer.

It should be noted that an RLF Report must not necessarily comprise all the above identified information elements. Any of the information elements, some of the information elements or all of the information elements may be optional information elements. In particular, the information elements measResultLastServCell, measResultNeighCells, locationInfo, failedPCellId, reestablishmentCellId, timeConnFailure, connectionFailureType, previousPCellId and beamMobility may be optionally included in the RLF Report. Accordingly, FIG. 6 shows an embodiment of an RLF Report that is comprised of an RLFReportContainer element that includes the measResultLastServCell, failedPCellId, and the beamMobility information elements.

It should also be noted that the embodiments of the invention are not limited to an RLF report message as defined in the standard documents (e.g. ETSI document TS 36 300). An RLF report according to the embodiments may however be based on such an RLF report message according to the standard, it may be a modification of such an RLF report message according to the standard, or it may be a similar message.

FIG. 7a describes an embodiment of a Radio Link Failure (RLF) Indication message according to the present disclosure. This Radio Link Failure (RLF) Indication message may be sent by a target eNB to a source eNB via the X2-AP interface, as it is described above with regard to 107 in FIG. 1. The RLF Indication message according to this embodiment comprises as information elements: reestablishmentCellECGI, FailureCellPCI, C-RNTI, ShortMAC-I, RLFReportContainer, RRCConnSetupindicator, and RRCConnReestabIndicator. The information element FailureCellPCI indicates the PCI of the cell to which the UE was connected when the radio link failure occurred. This information is extracted from the RRC Connection Re-establishment Request message from the UE. The FailureCellPCI information element is not used if the UE used the RRC connection setup procedure rather than the RRC connection reestablishment procedure. The reestablishmentCellECGI information element provides the identity of the cell where the RRC connection reestablishment procedure was completed, i.e. the identity of one of the cells belonging to the target eNB 14 in FIG. 1. This information element is not used if the UE used the RRC connection setup procedure rather than the RRC connection re-establishment procedure. The C-RNTI defines the identity of the UE allocated by the source cell prior to the radio link failure. This information is contained in the RRC Connection Re-establishment Request message from the UE. The C-RNTI information element is not used if the UE used the RRC connection setup procedure rather than the RRC connection re-establishment procedure. The ShortMAC-I information element is provided to the source eNB to resolve a potential PCI confusion situation. Both, the C-RNTI and the ShortMAC-I are contained in the RRC Reestablishment Request message. The ShortMAC-I information element is not used if the UE used the RRC connection setup procedure rather than the RRC connection reestablishment procedure. The RLFReportContainer comprises RLF information, as it is described above with regard to the embodiment of FIGS. 5b and 6. The RRCConnSetupIndicator is included if the RLF Report within the UE RLF Report Container IE is retrieved after an RRC connection setup or an incoming successful handover. The RRCConnReestabIndicator describes the Reestablishment Cause in RRCConnection Reestablishment Request message.

FIG. 7b describes an alternative embodiment of a Radio Link Failure (RLF) Indication message according to the present disclosure. According to this embodiment, the beamMobility information element is not comprised in the RLFReportContainer, but is transmitted as an additional information element of the RLF Indication message in parallel to the RLFReportContainer.

As described with regard to the embodiment of FIG. 5 above, the RLFReportContainer information element may for example comprise one or more of the following information elements: measResultLastServCell, measResultNeighCells, locationInfo, failedPCellId, reestablishmentCellId, timeConnFailure, connectionFailureType, previousPCellId, and beamMobility. These RLFReportContainer information elements can be used by the source eNB to determine the nature of the radio link failure. The RLF information contained in the RLFReportContainer can for example be extracted by the target eNB from a UE Information Response message received from a UE as described with regard to process 106 in FIG. 1.

Radio Link Failures (RLFs) may happen in NR and may happen even more predominantly while operating at higher frequencies and mobility parameters may require further optimization compared to LTE or low frequency operation (<6 GHz). If a UE sends an RLF report after experiencing a loss of connection on high frequencies then it is useful for the network to know which beams UE was using at the time of RLF and surrounding environment related to measurements of other beams, time spent in serving beam, fallback beam configuration, timestamp at the time of RLF etc. Such information may help the network to optimize mobility robustness algorithms and help reduce number of failures. Accordingly, an RLF report may include such beam specific information in particular when operating at higher frequencies.

FIG. 8 describes an embodiment of beam specific information according to the present disclosure. A beamMobility information element acts as a container for beam specific information, e.g. information concerning the beams a UE was using at the time of the RLF and/or surrounding environment related to measurements of other beams, time spent in serving beam, fallback beam configuration, timestamp at the time of RLF etc. In the embodiment of FIG. 8 the beamMobility container comprises as information elements: bestBeamId, bestBeamMeasResult, detectedBeamsIds, detectedBeamsMeasResults, fallbackBeamId, fallbackBeamMeasResults, servingBeamId, neighbouringBeamsIds, ULreferenceSignals, SFNaerald, FailedBeamId, FailedBeamTimestamp, and spentTime.

The information elements bestBeamId and bestBeamMeasResult may provide information about the best beam, namely its ID and its measurements. In addition, or alternatively, beamMobility may define the number (or set) of best beams (IDs and their measurements). The information elements detectedBeamsIds and detectedBeamsMeasResults may provide information about the beams detected by the UE, e.g. the respective beam IDs and their measurements. In addition or alternatively, beamMobility may identify beams above a predefined threshold and their ID and respective measurements. The information elements fallbackBeamId and fallbackBeamMeasResults may provide fallback beam IDs where the UE can fallback in the event of a failure of a main (serving) beam and corresponding measurements. The information element servingBeamId may provide the identity of the serving beam. The information element neighbouringBeamsIds may provide the identities of neighbouring beams. The information element ULreferenceSignals may provide UL reference signals corresponding to serving/neighbouring beam. The information element SFNaerald may provide a SFN (Single Frequency Network) Area ID. The information elements FailedBeamId and FailedBeamTimestamp may provide a Failed beam ID and timestamp of the RLF. The information element spentTime may provide a time the UE spent in a serving beam and/or fallback beams before the RLF happened.

In addition to the information listed above, the beamMobility container may comprise other information that can help the network to optimize mobility robustness algorithms and help reduce the number of failures. For example, with regard to this information element spentTime, an alternative/ addition to a "time spent in serving beam" could be the time spent in a combination of a serving beam and its configured fallback beam. A further enhancement could be where UE is configured with multiple fallback beam sets and UE time spent corresponds to the time spent in one of such fallback beam sets (a fallback beam set configuration will always have a serving beam for a UE and serving beam may be determined at L1 or L3 signaling). If a time of stay is e.g. less than 5 seconds in one fallback beam set then the network may not configure such fallback beam set for UEs. Such information will be useful for the network to determine the fallback set configuration.

The beam ID and its cell ID association can be included in the RLF report as well. For example the cell ID for detected beams may be included as detected beams may belong to different cells.

Still further, if beam mobility information is sent in a separate message, i.e. a RLF report container element that comprises a cell ID (such as failedPCellID in FIG. 5b) is not used, but a new message is used, then cell ID information can be added to the beamMobility information.

Measurement quantities such as bestBeamMeasResult, detectedBeamsMeasResults, fallbackBeamMeasResults, etc. could for example be RSRP, RSRQ, RSSI, and/or SINR or a new measurement quantity defined based on beam specific reference signals.

The above information may for example be included in an RLF report and exchanged between base stations including other RATs like LTE and UMTS.

In the embodiments of FIG. 8 the information elements bestBeamId, bestBeamMeasResult, detectedBeamsIds, detectedBeamsMeasResults, fallbackBeamId, fallbackBeamMeasResults, servingBeamId, neighbouringBeamsIds, ULreferenceSignals, SFNaerald, FailedBeamId, FailedBeamTimestamp, and spentTime are comprised in a beamMobility container which is a subcomponent of the RLFReportContainer. According to alternative embodiments, however, one or more of these information elements may be directly included as information elements of the RLF report. Accordingly, FIG. 9 provides an alternative embodiment in which beam specific information, here the information elements bestBeamId, bestBeamMeasResult, detectedBeamsIds, detectedBeamsMeasResults are not included in a beamMobility container element, but instead are directly included as information elements of the RLFReportContainer.

In the case that beam mobility information is comprised in a new message and not included in rlf-report, beams and cell IDs relationship can be included in the message.

FIG. 10a describes an embodiment of a Handover Report message according to the present disclosure. This Handover Report message may be sent by a target eNB to a source eNB via the X2-AP interface. The Handover Report message according to this embodiment comprises as information elements: MessageType, HandoverReportType, HandoverCause, SourceCellECGI, HandoverCause, FailureCellECGI, Re-establishmentCellECGI, TargetCellinUTRAN, SourceCellC-RNTI, MobilityInformation, and RLFReportContainer. The RLFReportContainer information element is used to provide the RLF Report received in the RLF Indication message from one eNB to another eNB. The RLFReportContainer comprises a beamMobility information element that acts as a container for beam specific information, as it described above with regard to the embodiment of FIG. 8. The remaining information elements of the Handover Report message transfer mobility related information between eNBs.

FIG. 10b describes an alternative embodiment of a Handover Report message according to the present disclosure. According to this embodiment, the beamMobility information element is not comprised in the RLFReportContainer, but is transmitted as an additional information element of the Handover Report message in parallel to the RLFReportContainer.

Figure 11:
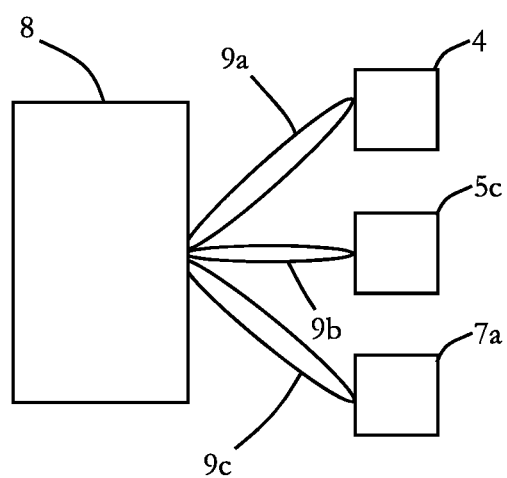
FIG. 11 illustrates beamforming of beams emitted from an antenna array.

FIG. 11 illustrates an antenna array 8, which may be employed by an eNB (anchor or slave), e.g. anchor cell base station, hot spots or even by a UE, establishing a virtual cell. The antenna array 8 can provide several beams by beamforming, for example, beams 9a, 9b and 9c for communicating with different UEs, e.g. UEs 4, 5c and 7a.

In the following, an embodiment of a general purpose computer 130 is described under reference of FIG. 12. The computer 130 can be implemented such that it can basically function as any type of apparatus or entity, base station or new radio base station, transmission and reception point, or user equipment as described herein. The computer has components 131 to 140, which can form a circuitry, such as any one of the circuitries of the entities, base stations, and user equipments, as described herein.

Embodiments which use software, firmware, programs or the like for performing the methods as described herein can be installed on computer 130, which is then configured to be suitable for the concrete embodiment.

The computer 130 has a CPU 131 (Central Processing Unit), which can execute various types of procedures and methods as described herein, for example, in accordance with programs stored in a read-only memory (ROM) 132, stored in a storage 137 and loaded into a random access memory (RAM) 133, stored on a medium 140 which can be inserted in a respective drive 139, etc.

The CPU 131, the ROM 132 and the RAM 133 are connected with a bus 141, which in turn is connected to an input/output interface 134. The number of CPUs, memories and storages is only exemplary, and the skilled person will appreciate that the computer 130 can be adapted and configured accordingly for meeting specific requirements which arise, when it functions as a base station, and user equipment.

At the input/output interface 134 several components are connected: an input 135, an output 136, the storage 137, a communication interface 138 and the drive 139, into which a medium 140 (compact disc, digital video disc, compact flash memory, or the like) can be inserted.

The input 135 can be a pointer device (mouse, graphic table, or the like), a keyboard, a microphone, a camera, a touchscreen, etc.

The output 136 can have a display (liquid crystal display, cathode ray tube display, light emittance diode display, etc.), loudspeakers, etc.

The storage 137 can have a hard disk, a solid state drive and the like.

The communication interface 138 can be adapted to communicate, for example, via a local area network (LAN), wireless local area network (WLAN), mobile telecommunications system (GSM, UMTS, LTE, etc.), Bluetooth, infrared, etc.

It should be noted that the description above only pertains to an example configuration of computer 130. Alternative configurations may be implemented with additional or other sensors, storage devices, interfaces or the like. For example, the communication interface 138 may support other radio access technologies than the mentioned UMTS and LTE.

When the computer 130 functions as a base station, the communication interface 138 can further have a respective air interface (providing e.g. E-UTRA protocols OFDMA (downlink) and SCFDMA (uplink)) and network interfaces (implementing for example protocols such as S1-AP, GTPU, S1-MME, X2-AP, or the like). Moreover, the computer 130 may have one or more antennas and/or an antenna array. The present disclosure is not limited to any particularities of such protocols.

The methods as described herein are also implemented in some embodiments as a computer program causing a computer and/or a processor and/or a circuitry to perform the method, when being carried out on the computer and/or processor and/or circuitry. In some embodiments, also a nontransitory computer-readable recording medium is provided that stores therein a computer program product, which, when executed by a processor/circuitry, such as the processor/circuitry described above, causes the methods described herein to be performed.

It should be recognized that the embodiments describe methods with an exemplary ordering of method steps. The specific ordering of method steps is, however, given for illustrative purposes only and should not be construed as binding.

Figure 12:
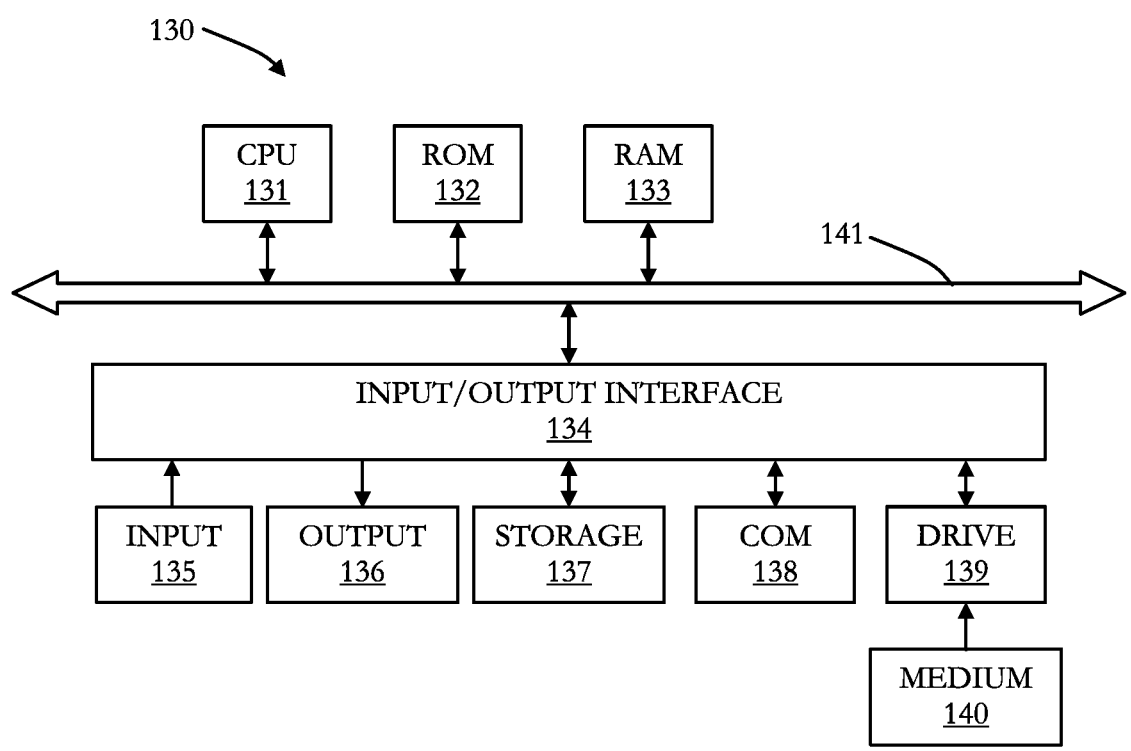
FIG. 12 describes an embodiment of a general purpose computer that may function as any type of apparatus or entity, base station or new radio base station, transmission and reception point, or user equipment.

It should also be noted that the division of the control or circuitry of FIG. 12 into units 131 to 140 is only made for illustration purposes and that the present disclosure is not limited to any specific division of functions in specific units. For instance, at least parts of the circuitry could be implemented by a respective programmed processor, field programmable gate array (FPGA), dedicated circuits, and the like.

All units and entities described in this specification and claimed in the appended claims can, if not stated otherwise, be implemented as integrated circuit logic, for example on a chip, and functionality provided by such units and entities can, if not stated otherwise, be implemented by software.

In so far as the embodiments of the disclosure described above are implemented, at least in part, using software-controlled data processing apparatus, it will be appreciated that a computer program providing such software control and a transmission, storage or other medium by which such a computer program is provided are envisaged as aspects of the present disclosure.

Note that the present technology can also be configured as described below.

(1) An apparatus comprising circuitry configured to receive or transmit a report, the report comprising beam specific information.

(2) The apparatus of (1) wherein the report is a radio link failure report.

(3) The apparatus of (1) wherein the report is a mobility report.

(4) The apparatus of anyone of (1) to (3), wherein the beam specific information comprises information about beams used at the time of a radio link failure.

(5) The apparatus of (1) to (4), wherein the beam specific information comprises information about the surrounding environment at the time of a radio link failure.

(6) The apparatus of anyone of (1) to (5), wherein the beam specific information comprises measurements of other beams, time spent in a serving beam, time spent in a combination of a serving beam and its configured fallback beam, time spent in a fallback beam set, a fallback beam configuration, and/or a timestamp at the time of a radio link failure.

(7) The apparatus of anyone of (1) to (6), wherein the beam specific information comprises one or more of the following information elements:

information elements (bestBeamId, bestBeamMeasResult) that provide information about the Best beam ID and its measurements;

an information element (beamMobility) that define the N number of best beam IDs and their measurements information elements (detectedBeamsIds, detectedBeamsMeasResults) that provide information about the beams detected by the User Equipment, e.g. the respective beam IDs and their measurements;

information elements that identify beams above a predefined threshold and their ID and respective measurements;

information elements (fallbackBeamID, fallbackBeamMeasResults) that provide fallback beam IDs where the User Equipment can fallback in the event of a failure of a main (serving) beam and corresponding measurements;

an information element (servingBeamId) that provides the identity of the serving beam; information elements (neighbouringBeamsIds) that provide the identities of neighbouring beams;

information elements (ULreferenceSignals) that provide User Equipment reference signals corresponding to a serving or neighbouring beam;

an information element (SFNaeraId) that provides a Single Frequency Network Area ID;

information elements (FailedBeamId, FailedBeamTimestamp) that provide a Failed beam ID and timestamp of a radio link failure;

an information element (spentTime) that provides a time the User Equipment spent in a serving beam before the radio link failure happened;

an information element that provides a time spent in a combination of a serving beam and its configured fallback beam; and an information element that provides a time spent in a fallback beam set.

(8) The apparatus of anyone of (1) to (7) wherein the apparatus is a Transmission/Reception Point (TRP) of a New Radio Access Technology System (NR).

(9) The apparatus of anyone of (1) to (8) wherein the apparatus is a User Equipment (UE) or an Evolved Node B (eNB).

(10) The apparatus of anyone of (1) to (9) wherein the beam specific information relates to a radio link failure between a User Equipment (12) and an Evolved Node B (10) or a gNB.

(11) The apparatus of anyone of (1) to (10) wherein the circuitry is configured to gather beam specific information while operating at higher frequencies, e.g. at frequencies above 6 GHz.

(12) The apparatus of anyone of (1) to (11) wherein the circuitry is configured to gather beam specific information while operating using beam forming.

(13) The apparatus of anyone of (1) to (12), wherein the apparatus is a User Equipment (12) that is configured to send the radio link failure report to a target Evolved Node B (14) after experiencing a radio link failure at a source Evolved Node B (10).

(14) The apparatus of anyone of (1) to (13), wherein the apparatus is a target Evolved Node B (14) is configured to receive, during a re-connection process, a radio link failure report from a User Equipment (12) that experienced a radio link failure at a source Evolved Node B (10), and to transmit the received radio link failure report to this source Evolved Node B (10).

(15) Method comprising receiving or transmitting a report, the report comprising beam specific information.

(16) The method of (15) wherein the report is a radio link failure report.

(17) The method of (15) wherein the report is a mobility report.

(18) The method of (15) or (16), wherein the beam specific information comprises information about beams used at the time of a radio link failure.

(19) The method of (15) to (18), wherein the beam specific information comprises information about the surrounding environment at the time of a radio link failure.

(20) The method of anyone of (15) to (19), wherein the beam specific information comprises measurements of other beams, time spent in a serving beam, time spent in a combination of a serving beam and its configured fallback beam, time spent in a fallback beam set, a fallback beam configuration, and/or a timestamp at the time of a radio link failure.

(21) The method of anyone of (15) to (20), wherein the beam specific information comprises one or more of the following information elements:

information elements (bestBeamId, bestBeamMeasResult) that provide information about the Best beam ID and its measurements;

an information element (beamMobility) that define the N number of best beam IDs and their measurements information elements (detectedBeamsIds, detectedBeamsMeasResults) that provide information about the beams detected by the User Equipment, e.g. the respective beam IDs and their measurements;

information elements that identify beams above a predefined threshold and their ID and respective measurements;

information elements (fallbackBeamID, fallbackBeamMeasResults) that provide fallback beam IDs where the User Equipment can fallback in the event of a failure of a main (serving) beam and corresponding measurements;

an information element (servingBeamId) that provides the identity of the serving beam; information elements (neighbouringBeamsIds) that provide the identities of neighbouring beams;

information elements (ULreferenceSignals) that provide User Equipment reference signals corresponding to a serving or neighbouring beam;

an information element (SFNaeraId) that provides a Single Frequency Network Area ID; information elements (FailedBeamId, FailedBeamTimestamp) that provide a Failed beam ID and timestamp of a radio link failure;

an information element (spentTime) that provides a time the User Equipment spent in a serving beam before the radio link failure happened;

an information element that provides a time spent in a combination of a serving beam and its configured fallback beam; and an information element that provides a time spent in a fallback beam set.

(22) The method of anyone of (15) to (21) wherein the beam specific information relates to a radio link failure between a User Equipment (12) and an Evolved Node B (10) or a gNB.

(23) The method of anyone of (15) to (22) comprising gathering beam specific information while operating at higher frequencies, e.g. at frequencies above 6 GHz.

(24) The method of anyone of (15) to (23) comprising gathering beam specific information while operating using beam forming.

(25) The method of anyone of (15) to (24), wherein a User Equipment (12) sends a radio link failure report to a target Evolved Node B (14) after experiencing a radio link failure at a source Evolved Node B (10).

(26) The method of anyone of (15) to (25), wherein a target Evolved Node B (14) receives, during a re-connection process, a radio link failure report from a User Equipment (12) that experienced a radio link failure at a source Evolved Node B (10), and transmits the received radio link failure report to this source Evolved Node B (10).

The invention claimed is:

1. An apparatus, comprising:
circuitry configured to receive or transmit a report that includes beam specific information, wherein
the beam specific information includes time spent in a serving beam, time spent in a combination of a serving beam and a fallback beam, time spent in a fallback beam set and a fallback beam configuration.

2. The apparatus of claim 1, wherein the report is a radio link failure report.

3. The apparatus of claim 1, wherein the report is a mobility report.

4. The apparatus of claim 1, wherein the beam specific information further comprises information about beams used at a time of a radio link failure.

5. The apparatus of claim 1, wherein the beam specific information further comprises information about the surrounding environment at a time of a radio link failure.

6. The apparatus of claim 1, wherein the beam specific information further comprises measurements of other beams and/or a timestamp at a time of a radio link failure.

7. The apparatus of claim 1, wherein the beam specific information further comprises one or more of the following information elements:
  information elements that provide information about the Best beam ID and its measurements;
  an information element that define the N number of best beam IDs and their measurements;
  information elements that provide information about the beams detected by the User Equipment;
  information elements that identify beams above a predefined threshold and their ID and respective measurements;
  information elements that provide fallback beam IDs where the User Equipment can fallback in a case of a failure of a serving beam and corresponding measurements;
  an information element that provides the identity of the serving beam;
  information elements that provide the identities of neighboring beams;
  information elements that provide UL reference signals corresponding to a serving or neighboring beam;
  an information element that provides a Single Frequency Network Area ID;
  information elements that provide a Failed beam ID and timestamp of a radio link failure;
  an information element that provides a time the User Equipment spent in a serving and/or fallback beam before an radio link failure happened;
  an information element that provides a time spent in a combination of a serving beam and its configured fallback beam; and
  an information element that provides a time spent in a fallback beam set.

8. The apparatus of claim 1, wherein the apparatus is a Transmission/Reception Point of a New Radio Access Technology System.

9. The apparatus of claim 1, wherein the apparatus is a User Equipment or an Evolved Node B.

10. The apparatus of claim 1, wherein the beam specific information relates to a radio link failure between a User Equipment and an Evolved Node B or a gNB.

11. The apparatus of claim 1, wherein the circuitry is configured to gather beam specific information while operating at frequencies above 6 GHz.

12. The apparatus of claim 1, wherein the circuitry is configured to gather beam specific information while operating using beam forming.

13. The apparatus of claim 1, wherein the apparatus is a User Equipment that is configured to send a radio link failure report to a target Evolved Node B after experiencing a radio link failure at a source Evolved Node B.

14. The apparatus of claim 1, wherein
  the apparatus is a target Evolved Node B, and
  the circuitry is configured to
    receive, during a re-connection process, a radio link failure report from a User Equipment that experienced a radio link failure at a source Evolved Node B, and
    transmit the received radio link failure report to the source Evolved Node B.

15. A method, comprising:
  receiving or transmitting a report that includes beam specific information, wherein
  the beam specific information includes time spent in a serving beam, time spent in a combination of a serving beam and a fallback beam, time spent in a fallback beam set and a fallback beam configuration.

16. A user equipment, comprising:
  circuitry configured to
    gather beam specific information while operating using beam forming; and
    transmit, to a base station, a report including the beam specific information, wherein
  the beam specific information includes time spent in a serving beam, time spent in a combination of a serving beam and a fallback beam, time spent in a fallback beam set and a fallback beam configuration.

17. The user equipment of claim 16, wherein the report is a radio link failure report.

18. The user equipment of claim 16, wherein the report is a mobility report.

19. The user equipment of claim 16, wherein the circuitry gathers the beam specific information while operating at frequencies above 6 GHz.

20. The user equipment of claim 16, wherein
  the base station is a target Evolved Node B,
  the circuitry is further configured to transmit, during a re-connection process after experiencing a radio link failure at a source Evolved Node B, a radio link failure report to the target Evolved Node B, and
  the target Evolved Node B transmits the received radio link failure report to the source Evolved Node B.

* * * * *